United States Patent
Taniguchi et al.

(10) Patent No.: US 9,941,493 B2
(45) Date of Patent: Apr. 10, 2018

(54) POWER STORAGE DEVICE PACKAGE MATERIAL AND STORAGE DEVICE USING THE SAME

(71) Applicant: TOPPAN PRINTING CO., LTD., Tokyo (JP)

(72) Inventors: Tomoaki Taniguchi, Tokyo (JP); Naoto Oono, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/331,289

(22) Filed: Oct. 21, 2016

(65) Prior Publication Data

US 2017/0040578 A1 Feb. 9, 2017

Related U.S. Application Data

(63) Continuation of application No. PCT/JP2015/062257, filed on Apr. 22, 2015.

(30) Foreign Application Priority Data

Apr. 24, 2014 (JP) .................................. 2014-090022

(51) Int. Cl.
*H01M 2/02* (2006.01)
*B32B 27/36* (2006.01)
(Continued)

(52) U.S. Cl.
CPC .............. *H01M 2/0287* (2013.01); *B32B 1/02* (2013.01); *B32B 7/12* (2013.01); *B32B 15/08* (2013.01);
(Continued)

(58) Field of Classification Search
None
See application file for complete search history.

(56) References Cited

U.S. PATENT DOCUMENTS

2006/0216586 A1* 9/2006 Tucholski ............. H01M 2/021
429/162
2012/0135301 A1* 5/2012 Akita .................. H01M 2/0212
429/185
(Continued)

FOREIGN PATENT DOCUMENTS

EP 3 065 192 A1 9/2016
JP 4559547 B2 10/2010
(Continued)

OTHER PUBLICATIONS

International Search Report issued in International Patent Application No. PCT/JP2015/062257 dated Jul. 28, 2015.
(Continued)

*Primary Examiner* — Daniel S Gatewood
(74) *Attorney, Agent, or Firm* — Foley & Lardner LLP

(57) ABSTRACT

A power storage device packaging material includes: a base material layer; a metal foil layer formed on one surface of the base material layer via an adhesive layer; and a sealant layer arranged on a surface of the metal foil layer, the surface of the metal foil layer being on the opposite side to the base material layer, wherein the base material layer contains a polyester resin that contains a polyester elastomer and/or an amorphous polyester.

5 Claims, 4 Drawing Sheets

(51) Int. Cl.
| | |
|---|---|
| *B32B 27/08* | (2006.01) |
| *B32B 7/12* | (2006.01) |
| *B32B 15/08* | (2006.01) |
| *H01G 11/22* | (2013.01) |
| *H01G 11/80* | (2013.01) |
| *H01G 11/78* | (2013.01) |
| *B32B 15/085* | (2006.01) |
| *B32B 15/088* | (2006.01) |
| *B32B 15/18* | (2006.01) |
| *B32B 15/20* | (2006.01) |
| *B32B 27/18* | (2006.01) |
| *B32B 27/28* | (2006.01) |
| *B32B 27/32* | (2006.01) |
| *B32B 27/34* | (2006.01) |
| *B32B 37/00* | (2006.01) |
| *B32B 1/02* | (2006.01) |

(52) U.S. Cl.
CPC .......... *B32B 15/085* (2013.01); *B32B 15/088* (2013.01); *B32B 15/18* (2013.01); *B32B 15/20* (2013.01); *B32B 27/08* (2013.01); *B32B 27/18* (2013.01); *B32B 27/281* (2013.01); *B32B 27/325* (2013.01); *B32B 27/34* (2013.01); *B32B 27/36* (2013.01); *B32B 27/365* (2013.01); *B32B 37/00* (2013.01); *H01G 11/22* (2013.01); *H01G 11/78* (2013.01); *H01G 11/80* (2013.01); *H01M 2/02* (2013.01); *H01M 2/026* (2013.01); *H01M 2/028* (2013.01); *H01M 2/0285* (2013.01); *B32B 2255/06* (2013.01); *B32B 2255/10* (2013.01); *B32B 2255/20* (2013.01); *B32B 2255/26* (2013.01); *B32B 2270/00* (2013.01); *B32B 2274/00* (2013.01); *B32B 2307/306* (2013.01); *B32B 2307/31* (2013.01); *B32B 2307/518* (2013.01); *B32B 2307/54* (2013.01); *B32B 2307/558* (2013.01); *B32B 2307/581* (2013.01); *B32B 2307/702* (2013.01); *B32B 2307/704* (2013.01); *B32B 2307/734* (2013.01); *B32B 2307/752* (2013.01); *B32B 2457/10* (2013.01); *B32B 2457/16* (2013.01); *B32B 2553/00* (2013.01); *H01M 2220/30* (2013.01)

(56) References Cited

U.S. PATENT DOCUMENTS

| | | | |
|---|---|---|---|
| 2014/0072864 A1* | 3/2014 | Suzuta | B32B 15/08 429/176 |
| 2015/0017518 A1* | 1/2015 | Taniguchi | B32B 15/08 429/176 |
| 2016/0248054 A1 | 8/2016 | Muroi | |

FOREIGN PATENT DOCUMENTS

| | | | | |
|---|---|---|---|---|
| JP | 2013-196947 A | | 9/2013 | |
| JP | 2013196947 A | * | 9/2013 | ............. B32B 15/08 |
| JP | 2014-017266 A | | 1/2014 | |
| JP | 2014017266 A | * | 1/2014 | ............. B32B 15/08 |

OTHER PUBLICATIONS

Extended European Search Report dated Aug. 22, 2017 in European Patent Application No. 15783412.8.

* cited by examiner

POWER STORAGE DEVICE PACKAGE MATERIAL AND STORAGE DEVICE USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/062257 filed on Apr. 22, 2015, which is based upon and claims the benefit of priority of Japanese Patent Application No. 2014-090022, filed on Apr. 24, 2014, the entire contents of which are all hereby incorporated by reference.

TECHNICAL FIELD

The present invention relates to a power storage device packaging material and a power storage device using the same.

BACKGROUND

As power storage devices, there are known secondary batteries, such as lithium ion batteries, nickel metal hydride batteries, and lead acid storage batteries, and electrochemical capacitors, such as electric double layer capacitors. Due to miniaturization or installation space restriction of mobile devices, for example, further miniaturization of power storage devices is sought, and therefore lithium ion batteries having high energy density are receiving attention. As packaging materials for lithium ion batteries, metal cans have been used. However, there is a trend recently toward use of multilayer films because of their light weight, high heat dissipation, and low production cost.

Lithium ion batteries using such a multilayer film as a packaging material have a structure of covering battery contents (a positive electrode, a separator, a negative electrode, an electrolyte, etc.) with a packaging material including an aluminum foil layer to thereby prevent entry of moisture. Lithium ion batteries having such a structure are referred to as aluminum laminated lithium ion batteries.

As an example of the aluminum laminated lithium ion batteries, embossed lithium ion batteries are known. In such an embossed lithium ion battery, a recess is formed in part of a packaging material by cold forming to store the battery contents in the recess, and the rest of the packaging material is folded back, with the edge portions being sealed by heat sealing (hereinafter, such a battery may be referred to as "single side formed battery"). In recent years, lithium ion batteries are also produced for the purpose of increasing energy density. In such a lithium ion battery, recesses are formed in two packaging materials to be bonded together to store more battery contents (hereinafter, such a battery may be referred to as "double side formed batteries"). Such a double side formed battery suffers from a problem of alignment difficulty in bonding the packaging materials to each other. However, for a single side formed battery to obtain energy density equivalent to that of a double side formed battery, a deeper recess is required to be formed.

The energy density of a lithium ion battery becomes higher as a deeper recess is formed by cold forming. However, forming a deeper recess is likely to create pinholes or cause breaking in the packaging material during forming, resulting in deterioration in formability. As a measure against this, a biaxially oriented polyamide film, such as a biaxially oriented nylon film (hereinafter, may be referred to as "biaxially oriented Ny film"), is used for a base material layer of a packaging material to protect the metal foil. However, such a biaxially oriented Ny film has low resistance against an electrolyte that is a contents of the lithium ion battery. When an electrolyte is contacted to the biaxially oriented Ny film during injection of the electrolyte in producing a lithium ion battery, the biaxially oriented Ny film is dissolved, resulting in a poor appearance.

To cope with this, there is proposed a packaging material having a base material layer whose surface is imparted with electrolytic resistance (e.g., refer to PTL 1). In this packaging material, a biaxially oriented polyethylene terephthalate film (hereinafter, may be referred to as "biaxially oriented PET film") is further laminated outside the biaxially oriented Ny film.

CITATION LIST

Patent Literature

PTL 1: JP-B-4559547

SUMMARY OF THE INVENTION

Technical Problem

However, when a conventional packaging material is deep drawn to form a recess therein as described above, the packaging material after being formed may warp greatly towards its base material layer. Such a tendency is particularly pronounced when single side formed batteries are produced. The mechanism of occurring warpage in a packaging material is considered to be that, when the packaging material has been formed by being drawn, the drawn base material layer tends to return to the original state. It is difficult for the packaging material obtained in PTL 1 to solve the problem of warpage. The present inventor considers the reason to be as follows. Specifically, in the packaging material of PTL 1, a metal foil layer is sandwiched between a base material layer and a heat adhesive resin layer. The base material layer on one side of the metal foil is formed of a biaxially oriented PET film and a biaxially oriented Ny film. The heat adhesive resin layer provided on the other side of the metal foil is made of a heat adhesive resin layer, such as an acid-modified polyolefin resin. Compared to the heat adhesive resin layer, the base material layer has a significantly larger upper yield strength in a tensile test. Thus, the force to return to the original state against drawing during forming is greater on the base material layer side, which is considered to cause warpage.

Warpage after forming leads to suction error when the packaging material is sucked and transferred to the next processing step or the like, or leads to a heat sealing defect during heat sealing that is the next processing step.

The present invention has been made in view of the circumstances set forth above and has as its object to provide a power storage device packaging material that is capable of maintaining good formability while reducing warpage after being formed, and a power storage device using the same.

Solution to Problem

To achieve the above object, the present invention provides a power storage device packaging material, including: a base material layer; a metal foil layer formed on one surface of the base material layer via an adhesive layer; and a sealant layer arranged on a surface of the metal foil layer, the surface of the metal foil layer having the sealant layer being on the opposite side of the metal foil layer to the base material layer, wherein the base material layer contains a polyester resin that contains a polyester elastomer and/or an amorphous polyester.

The power storage device packaging material (hereinafter, may be simply referred to as "packaging material") includes a base material layer containing a polyester resin that contains a polyester elastomer and/or an amorphous polyester as the base material layer, and thus is capable of preventing creation of pinholes, occurrence of breaking, or the like in the packaging material during forming to thereby achieve good formability. The packaging material is also capable of reducing the base material layer side upper yield strength during forming (the base material layer side that is relative to the metal foil layer), suppressing the base material layer side contraction after forming, and reducing the amount of warpage.

In the power storage device packaging material, the base material layer preferably has a thickness in a range of not less than 5 µm to not more than 30 µm. The base material layer having a thickness of not less than 5 µm can improve formability. The base material layer having a thickness of not more than 30 µm can more sufficiently suppress the rate of contraction in the portion drawn on the base material layer side forming. Thus, the shape after forming is readily maintained and the amount of warpage is reduced more.

The present invention also provides a power storage device packaging material, including: a first base material layer; a second base material layer formed on one surface of the first base material layer via a first adhesive layer; a metal foil layer formed on a surface of the second base material layer via a second adhesive layer, the surface of the second base material layer having the metal foil layer being on the opposite side of the second base material layer to the first base material layer; and a sealant layer arranged on a surface of the metal foil layer, the surface of the metal foil layer having the sealant layer being on the opposite side of the metal foil layer to the second base material layer, wherein the first base material layer contains a polyester resin that contains a polyester elastomer and/or an amorphous polyester, and the second base material layer is an oriented polyamide film.

Being provided with an oriented polyamide film as a second base material layer, the power storage device packaging material (hereinafter, may be simply referred to as "packaging material") is capable of inhibiting creation of pinholes, occurrence of breaking, or the like in the packaging material during forming to thereby achieve good formability. In addition, being provided with a first base material layer containing a polyester resin that contains a polyester elastomer and/or an amorphous polyester, the packaging material is capable of reducing the base material layer side upper yield strength during forming of the outer package (the first and second base material layers relative to the metal foil layer), suppressing the base material layer side contraction after forming, and reducing the amount of warpage. The effect of reducing the amount of warpage by the first base material layer is particularly prominently exhibited in combination with an oriented polyamide film, which is the second base material layer. That is, an oriented polyamide film is likely to cause warpage after forming, while improving formability of the packaging material, whereas the first base material layer can mitigate such an influence of the oriented polyamide film and prevent warpage.

In the power storage device packaging material, the first base material layer preferably has a thickness in a range of not less than 4 µm to not more than 20 µm, and the second base material layer preferably has a thickness in a range of not less than 5 µm to not more than 20 µm. The first base material layer having a thickness of not less than 4 µm and the second base material layer having a thickness of not more than 20 µm can more sufficiently suppress the rate of contraction in the portion drawn by the base material layer side forming. Thus, the shape after forming is readily maintained and the amount of warpage is reduced more. The first base material layer having a thickness of not more than 20 µm and the second base material layer having a thickness of not less than 5 µm can more improve formability.

In the power storage device packaging material, a content of the polyester elastomer in the polyester resin is preferably in a range of 2 to 15 mass % relative to a total amount of the polyester resin. Further, a content of the amorphous polyester is preferably in a range of 20 to 60 mass % relative to a total amount of the polyester resin. Accordingly, the rate of contraction in the portion drawn by the base material layer side forming can be more sufficiently suppressed. Thus, the shape after forming is readily maintained and the amount of warpage is reduced more.

The present invention also provides a power storage device, including: a battery element including electrodes; leads respectively extending from the electrodes; and a container for storing the battery element therein, wherein the container is formed of the power storage device packaging material of the present invention, with the sealant layer being located inside. The power storage device uses the above power storage device packaging material of the present invention as a container for storing the battery element therein. Thus, the device is provided with a container not creating pinholes or causing breaking, with reduced warpage.

Advantageous Effects of the Invention

The present invention provides a power storage device packaging material that are capable of maintaining good formability while reducing warpage after forming, and provides a power storage device using the same.

DESCRIPTION OF REPRESENTATIVE EMBODIMENTS

Figure 1:
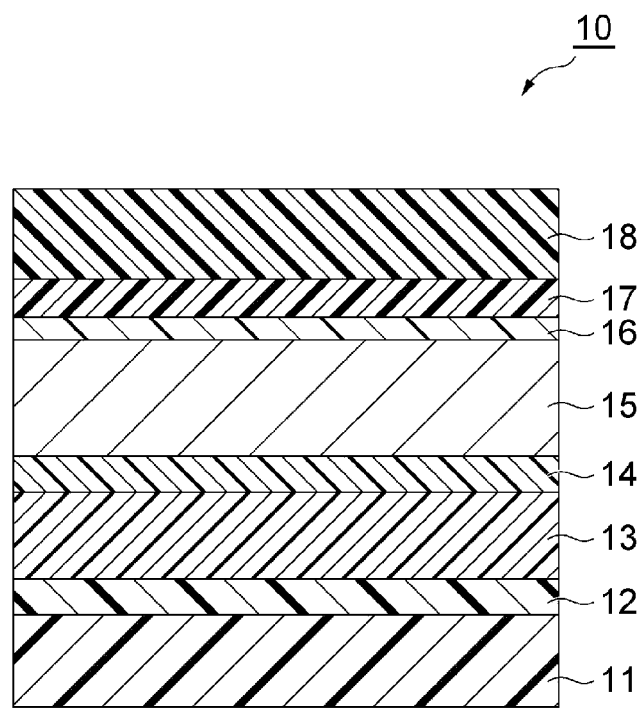
FIG. 1 is a schematic cross-sectional view of a power storage device packaging material, according to an embodiment of the present invention.

Preferred embodiments of the present invention will be described below in detail with reference to the drawings. However, it is to be understood that the invention is not necessarily limited to the representative embodiments described, below. In the drawings, the same or equivalent components are given the same reference signs to omit repetitive description.

[Packaging Material for Power Storage Device]

FIG. 1 is a cross-sectional view schematically illustrating an embodiment of a power storage device packaging material of the present invention. As illustrated in FIG. 1, a packaging material (power storage device packaging material) 10 of the present embodiment is a laminate formed of layers laminated in the order of a first base material layer 11, a second base material layer 13 formed on one surface of the first base material layer 11 via a first adhesive layer 12, a metal foil layer 15 formed on a surface of the second base material layer 13 via a second adhesive layer 14, the surface of the second base material layer 13 being on the opposite side to the first base material layer 11, an anticorrosion treatment layer 16 formed on a surface of the metal foil layer 15, the surface of the metal foil layer 15 being on the opposite side to the second base material layer 13, and a sealant layer 18 formed on a surface of the anticorrosion treatment layer 16 via a sealant adhesive layer 17, the surface of the anticorrosion treatment layer 16 being on the opposite side to the metal foil layer 15. In the packaging material 10, the first base material layer 11 is an outermost layer and the sealant layer 18 is an innermost layer. That is, the packaging material 10 is used so that the first base material layer 11 is located outside and the sealant layer 18 is located inside with respect to the power storage device.

Figure 2:
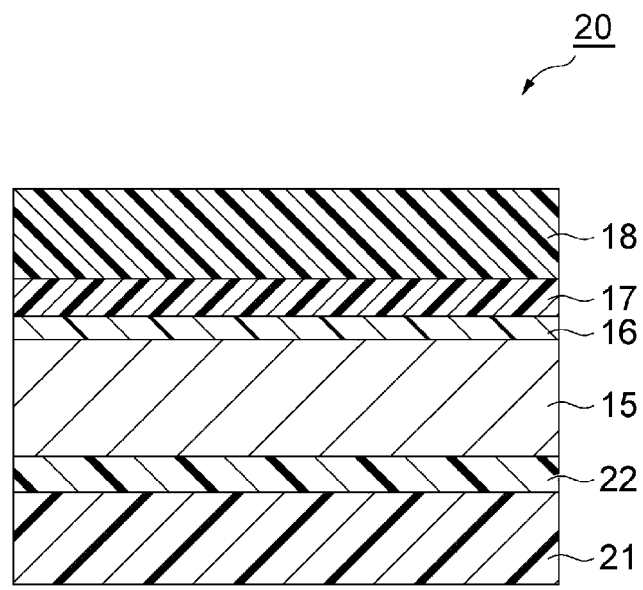
FIG. 2 is a schematic cross-sectional view of a power storage device packaging material, according to another embodiment of the present invention.

FIG. 2 is a cross-sectional view schematically illustrating another embodiment of a power storage device packaging material of the present invention. As illustrated in FIG. 2, the power storage device packaging material may have a single base material layer. A packaging material (power storage device packaging material) 20 illustrated in FIG. 2 is a laminate formed of layers laminated in the order of a base material layer 21, a metal foil layer 15 formed on one surface of the base material layer 21 via an adhesive layer 22, an anticorrosion treatment layer 16 formed on a surface of the metal foil layer 15, the surface of the metal foil layer 15 being on the opposite side to the base material layer 21, and a sealant layer 18 formed on a surface of the anticorrosion treatment layer 16 via a sealant adhesive layer 17, the surface of the anticorrosion treatment layer 16 being on the opposite side to the metal foil layer 15. In the packaging material 20, the base material layer 21 and the metal foil layer 15 are bonded together only via the adhesive layer 22 without any other base material layers intervening. The packaging material 20 has the base material layer 21 as an outermost layer and the sealant layer 18 as an innermost layer. That is, the packaging material 20 is used by locating the base material layer 21 on an outer side and the sealant layer 18 on an inner side with respect to the power storage device. The following description addresses the individual layers forming the packaging material 10 or 20.

(First Base Material Layer 11)

The first base material layer 11 imparts heat resistance to the packaging material 10, which is exerted in a pressure heat sealing process, described later, when producing a power storage device to prevent possible creation of pinholes during processing or distribution. The first base material layer 11 is configured to contain a polyester resin that contains a polyester elastomer and/or an amorphous polyester. The first base material layer 11 also serves as a layer to mitigate the rate of contraction in a portion drawn during forming. Use of a polyester resin containing a polyester elastomer and/or an amorphous polyester as a constituent material of the first base material layer 11 can reduce the upper yield strength for the tensile strain and significantly reduce warpage after forming.

The polyester elastomer is made up of a hard segment and a soft segment. The hard segment includes a crystalline polyester, such as polybutylene terephthalate, polybutylene naphthalate, or polyethylene terephthalate. From the perspective of flexibility, polybutylene terephthalate is particularly preferred. The soft segment includes a polyoxyalkylene glycol, such as polytetramethylene glycol, and a low melting point polyester, such as polycaprolactone or polybutylene adipate. From the perspective of hydrolysis resistance, heat resistance, and low-temperature characteristics, polytetramethylene glycol is particularly preferred. These materials may be used singly or in combination of two or more.

The polyester elastomer is a block copolymer of a hard segment and the soft segment. The amount of a soft segment to be copolymerized with a hard segment is preferably in the range of 20 to 95 mass % and more preferably in the range of 25 to 90 mass % relative to the total amount of the hard segment and the soft segment. When the amount of the soft segment to be copolymerized is more than 20 mass %, the amount of warpage after forming of the packaging material is more likely to be reduced. When the amount of the soft segment to be copolymerized is less than 95 mass %, heat resistance is likely to be maintained at a high level.

The amorphous polyester is a polyester resin with no crystallinity found or a polyester resin with low crystallinity and high transparency. Whether to be categorized as the amorphous polyester is determined by, for example, a melting peak being not found in differential scanning thermal analysis.

The polyester resin is produced by polycondensation of a polyhydric alcohol and a polycarboxylic acid, and the amorphous polyester is produced by selecting the polyhydric alcohol and polycarboxylic acid to be used. For example, when terephthalic acid and ethylene glycol are polycondensed, part of the ethylene glycol is changed to cyclohexanedimethanol to produce glycol-modified polyethylene terephthalate (PETG) or glycol-modified polycyclohexylene dimethylene terephthalate (PCTG), which is an amorphous polyester.

The amorphous polyester includes, other than PETG or PCTG mentioned above, an amorphous polyester obtained by heating and quenching a PET film when it is formed. Of these materials, PETG is preferred because an amorphous polyester is obtained regardless of the film forming method and because extrusion formability is good. These materials may be used singly or in combination of two or more.

Examples of the polyester resin that is a matrix resin containing a polyester elastomer and/or an amorphous polyester include polyethylene terephthalate, polybutylene terephthalate, polyethylene naphthalate, polybutylene naphthalate, and the like. Among them, polyethylene terephthalate is preferred from the perspective of material cost.

In the polyester resin containing a polyester elastomer, the content of the polyester elastomer is preferably in the range of 2 to 15 mass %, and more preferably in the range of 5 to 10 mass % relative to a total amount of the polyester resin containing polyester elastomer. When the content is 2 mass % or more, the amount of warpage after forming of the packaging material is likely to be more reduced. When the content is 15 mass % or less, the heat resistance is likely to be kept at a high level.

In the polyester resin containing an amorphous polyester, the content of the amorphous polyester is preferably in the range of 20 to 60 mass %, and more preferably in the range of 30 to 50 mass % relative to a total amount of the polyester resin containing amorphous polyester. When content is 20 mass % or more, the amount of warpage after forming of the packaging material is likely to be more reduced. When the content is 60 mass % or less, the heat resistance is likely to be kept at a high level.

In addition to the polyester resin containing a polyester elastomer and/or an amorphous polyester, the first base material layer 11 may further contain another component in a range not inhibiting the effects of the present invention. Examples of such an additional component include a polyamide resin, a polyolefin resin, a polyimide resin, a polycarbonate resin, and the like.

The first base material layer 11 that contains a polyester resin containing a polyester elastomer and/or an amorphous polyester is preferably an oriented film. From the perspective of having good piercing strength or impact strength, it is more preferable that the first base material layer 11 is a biaxially oriented polyethylene terephthalate film containing a polyester elastomer and/or an amorphous polyester.

The first base material layer 11 preferably has a thickness in the range of 4 to 20 μm, and more preferably in the range of 10 to 15 μm. There is a tendency that a first base material layer 11 having a thickness of 20 μm or less can cope with thickness reduction. When the first base material layer 11 has a thickness of 4 μm or more, the rate of contraction in a portion drawn in the base material layer side forming can be more sufficiently inhibited, and thus the shape after forming is easily maintained and the amount of warpage is likely to be more reduced.

(First Adhesive Layer 12)

The first adhesive layer 12 adheres the first base material layer 11 to the second base material layer 13. Adhesives that can be preferably used for the first adhesive layer 12 include a two-liquid curing urethane adhesive that allows a bifunctional or more aromatic or aliphatic isocyanate compound as a curing agent to react with a base resin made of a compound containing a hydroxyl group, such as polyester polyol, polyether polyol, or acrylic polyol. The urethane adhesive is aged at 40° C. for 4 or more days, for example, after being coated to promote reaction of the hydroxyl group of the base resin with an isocyanate group in the curing agent, thereby enabling strong adhesion between the first base material layer 11 and the second base material layer 13.

From the perspective of adhesion strength, conformability, processability, and the like, the first adhesive layer 12 preferably has a thickness in the range of 1 to 10 μm, and more preferably in the range of 3 to 7 μm.

(Second Base Material Layer 13)

The second base material layer 13 is formed of an oriented polyamide film. The oriented polyamide film has high strength, very good stretchability, and softness, which enables forming with a thin and sharp shape. Therefore, the packaging material 10 provided with the second base material layer 13 can obtain better formability compared with a packaging material lacking the second base material layer 13, such as the packaging material 20.

The oriented polyamide film includes Nylon 6 film, Nylon 11 film, Nylon 12 film, or the like. From the perspective of heat resistance, Nylon 6 film is preferred. From the perspective of having good piercing strength or impact strength, a biaxially oriented Nylon 6 (ONy) film is more preferred.

The second base material layer 13 preferably has a thickness in the range of 5 to 20 μm and more preferably in the range of 10 to 15 μm. A second base material layer 13 having a thickness of 5 μm or more is likely to achieve good formability. A second base material layer 13 having a thickness of 20 μm or less is likely to reduce more the amount of warpage after forming of the packaging material.

(Second Adhesive Layer 14)

The second adhesive layer 14 adheres the second base material layer 13 to the metal foil layer 15. Similar to the first adhesive layer 12, as the adhesive forming the second adhesive layer 14, it is preferable to use a two-liquid curing urethane adhesive that allows a bifunctional or more aromatic or aliphatic isocyanate compound to react with a base resin of a compound containing a hydroxyl group, such as polyester polyol, polyether polyol, or acrylic polyol. The urethane adhesive is aged at 40° C. for 4 or more days, for example, after being coated to promote reaction of the hydroxyl group of the base resin with an isocyanate group in the curing agent, enabling strong adhesion between the second base material layer 13 and the metal foil layer 15.

From the perspective of adhesion strength, conformability, processability, and the like, the second adhesive layer 14 preferably has a thickness in the range of 1 to 10 μm, and more preferably in the range of 3 to 7 μm.

(Base Material Layer 21)

Similar to the first base material layer 11, the base material layer 21 in the packaging material 20 is configured containing a polyester resin that contains a polyester elastomer and/or an amorphous polyester. Use of the polyester resin containing a polyester elastomer and/or an amorphous polyester as a material forming the base material layer 21 can inhibit creation of pinholes, occurrence of breaking, or the like in the packaging material 20 during forming and can achieve good formability. In addition, use of the above polyester resin can reduce the upper yield strength for the tensile strain and thus can significantly reduce warpage after forming.

When the base material layer is a single layer, the base material layer 21 preferably has a thickness in the range of 5 to 30 μm, and more preferably in the range of 10 to 25 μm. A base material layer 21 having a thickness of 30 μm or less can more sufficiently lower the rate of contraction in a portion drawn by the base material layer 21 side forming. As a result, the shape after forming is easily maintained and the amount of warpage is likely to be reduced more. A base material layer 21 having a thickness of 5 μm or more can inhibit creation of pinholes, occurrence of breaking, or the like in the packaging material during forming, resulting in achieving good formability. The base material layer 21 may have the same structure as that of the first base material layer 11 except for the thickness.

(Adhesive Layer 22)

The adhesive layer 22 adheres the base material layer 21 to the metal foil layer 15. Adhesives that can be preferably used for the adhesive layer 22 include a two-liquid curing urethane adhesive that allows a bifunctional or more aromatic or aliphatic isocyanate compound as a curing agent to react with a base resin made of a compound containing a hydroxyl group, such as polyester polyol, polyether polyol, or acrylic polyol. The urethane adhesive is aged at 40° C. for 4 or more days, for example, after being coated to promote reaction of the hydroxyl group of the base resin with an isocyanate group in the curing agent, enabling strong adhesion between the base material layer 21 and the metal foil layer 15.

From the perspective of adhesion strength, conformability processability, and the like, the adhesive layer 22 preferably has a thickness in the range of 1 to 10 μm, and more preferably in the range of 3 to 7 μm.

(Metal Foil Layer 15)

Materials for the metal foil layer 15 include various metal foils such as of aluminum and stainless steel. From the perspective of moisture barrier properties, processability such as spreadability, and cost, the metal foil layer 15 is preferably an aluminum foil. The aluminum foil may be a generally used soft aluminum foil, and from the perspective of having good pinhole resistance and spreadability during forming, an aluminum foil containing iron is preferred.

The aluminum foil (100 mass %) containing iron preferably has an iron content in the range of 0.1 to 9.0 mass %, and more preferably in the range of 0.5 to 2.0 mass %. When the iron content is 0.1 mass % or more, a packaging material 10 or 20 having better pinhole resistance and spreadability can be obtained. When the iron content is 9.0 mass % or less, a packaging material 10 or 20 having better flexibility can be obtained.

From the perspective of barrier properties, pinhole resistance, and processability, the metal foil layer 15 preferably has a thickness in the range of 9 to 200 μm, and more preferably in the range of 15 to 100 μm. Having a thickness of 9 μm or more, the metal foil layer 15 is unlikely to be broken if stress is applied during forming. If the metal foil layer 15 has a thickness of 200 μm or less, mass increase of the packaging material can be reduced and weight energy density of the power storage device can be prevented from being lowered.

(Anticorrosion Treatment Layer 16)

The anticorrosion treatment layer 16 has a role of inhibiting corrosion of the metal foil layer 15 due to hydrofluoric acid produced by reaction of the electrolyte with moisture. The anticorrosion treatment layer 16 also has a role of increasing an adhesion force between the metal foil layer 15 and the sealant adhesive layer 17.

Preferably, the anticorrosion treatment layer 16 is a film formed by coating a coating- or immersion-type acid resistant anticorrosion treatment agent. This coating film exerts good anticorrosion effect to protect the metal foil layer 15 from acid. In addition, since the anchoring effect intensifies the adhesion force between the metal foil layer 15 and the sealant adhesive layer 17, good resistance to power storage device elements, such as the electrolyte, can be obtained. The anticorrosion treatment layer 16 may be additionally provided between the second adhesive layer 14 or the adhesive layer 22 and the metal foil layer 15, depending on the required functions.

The coating film of the anticorrosion treatment agent is formed, for example, by ceria sol treatment that uses an anticorrosion treatment agent composed of cerium oxide, phosphate, and various thermosetting resins, or chromate treatment that uses an anticorrosion treatment agent composed of chromate, phosphate, fluoride, and various thermosetting resins. The anticorrosion treatment layer 16 is not limited to the above coating film as long as it offers sufficient corrosion resistance to the metal foil layer 15. The anticorrosion treatment layer 16 may be a coating film formed such as by phosphate treatment, boehmite treatment, or the like.

The anticorrosion treatment layer 16 may be a single layer or a multilayer. The anticorrosion treatment layer 16 may additionally contain an additive, such as a silane coupling agent. From the perspective of the anticorrosion function and the function as an anchor, the anticorrosion treatment layer 16 preferably has a thickness, for example, in the range of 10 nm to 5 μm, and more preferably in the range of 20 to 500 nm.

(Sealant Adhesive Layer 17)

The sealant adhesive layer 17 adheres the metal foil layer 15, on which the anticorrosion treatment layer 16 is formed, to the sealant layer 18. The packaging material 10 or 20 is roughly categorized as having a thermal laminate structure or a dry laminate structure, depending on the adhesive component forming the sealant adhesive layer 17.

In the thermal laminate structure, the adhesive component for forming the sealant adhesive layer 17 is preferably an acid-modified polyolefin resin obtained by graft-modifying a polyolefin resin with acid. In the acid-modified polyolefin resin, a polar group is introduced into part of the non-polar polyolefin resin. Thus, the acid-modified polyolefin resin is capable of strongly adhering to both the sealant layer 18 formed of a non-polar polyolefin resin film or the like and the anticorrosion treatment layer 16 usually having polarity. Use of the acid-modified polyolefin resin improves resistance of the packaging material 10 or 20 against the contents, such as the electrolyte, and readily prevents lowering of adhesion force due to deterioration of the sealant adhesive layer 17 if hydrofluoric acid is produced inside the battery.

Examples of the polyolefin resin as the acid-modified polyolefin resin include low-, medium- and high-density polyethylenes; ethylene-α olefin copolymers; polypropylenes; and propylene-α olefin copolymers. The polyolefin resin, when it is a copolymer, may be a block copolymer or may be a random copolymer. Polyolefin resins that can also be used include copolymers obtained by copolymerizing the materials mentioned above with polar molecules such as of acrylic acid or methacrylic acid, and polymers, such as crosslinked polyolefins. The acid used for modifying the polyolefin resin includes a carboxylic acid, an epoxy compound, acid anhydride, or the like, among which, maleic anhydride is preferred. The acid-modified polyolefin resin to be used for the sealant adhesive layer 17 may be one, or a mixture of two or more.

The sealant adhesive layer 17 of the thermal laminate structure is formed by extruding the adhesive component mentioned above by means of an extruder. The sealant adhesive layer 17 of the thermal laminate structure preferably has a thickness in the range of 2 to 50 μm.

Examples of the adhesive component forming the sealant adhesive layer 17 having the dry laminate structure include two-liquid curing polyurethane adhesives similar to those mentioned in describing the first adhesive layer 12 and the second adhesive layer 14.

The sealant adhesive layer 17 of the dry laminate structure has a highly hydrolyzable bonding portion, such as an ester group or a urethane group. Therefore, for usage requiring higher reliability, an adhesive component of the thermal laminate structure is preferably used as the sealant adhesive layer 17.

The sealant adhesive layer 17 of the thermal laminate structure preferably has a thickness in the range of not less than 8 μm to not more than 50 μm, and more preferably in the range of not less than 20 μm to not more than 40 μm. When the sealant adhesive layer 17 has a thickness of 8 μm or more, sufficient adhesion strength is easily obtained between the metal foil layer 15 and the sealant layer 18.

When the sealant adhesive layer 17 has a thickness of 50 μm or less, the amount of moisture entering into the battery element from an end face of the packaging material can be easily reduced. The sealant adhesive layer 17 of the dry laminate structure preferably has a thickness in the range of not less than 1 μm to not more than 5 μm. When the sealant adhesive layer 17 has a thickness of 1 μm or more, sufficient adhesion strength is easily obtained between the metal foil layer 15 and the sealant layer 18. When the sealant adhesive layer 17 has a thickness of 5 μm or less, breaking is prevented from occurring in the sealant adhesive layer 17.

(Sealant Layer 18)

The sealant layer 18 imparts sealability to the packaging material 10 or 20 by heat sealing. The sealant layer 18 can be a resin film made of a polyolefin resin, and an acid-modified polyolefin resin obtained by graft-modifying a polyolefin resin with acid, such as maleic anhydride.

Examples of the polyolefin resin include low-, medium- and high-density polyethylenes; ethylene-α olefin copolymers; polypropylenes; and propylene-α olefin copolymers. The polyolefin resin, when it is a copolymer, may be a block copolymer or may be a random copolymer. These polyolefin resins may be used singly or in combination of two or more.

Examples of the acid-modified polyolefin resin include ones similar to those mentioned in describing the sealant adhesive layer 17.

The sealant layer 18 may be a single-layer film or may be a multilayer film, which may be selected depending on the required functions. For example, from the perspective of imparting moisture barrier properties, a multilayer film is used, intervened by a resin, such as an ethylene-cyclic olefin copolymer or polymethylpentene.

The sealant layer 18 may contain various additives, such as a flame retardant, slip agent, antiblocking agent, antioxidant, photostabilizer, and tackifier.

The sealant layer 18 preferably has a thickness in the range of 10 to 100 μm, and more preferably in the range of 20 to 60 μm. When the sealant layer 18 has a thickness of 20 μm or more, sufficient heat sealing strength is obtained. When the sealant layer 18 has a thickness of 90 μm or less, the amount of moisture entering from an end of the packaging material can be reduced.

[Method of Producing Packaging Material]

The following description sets forth a method of producing the packaging material 10. The method of producing the packaging material 10 is not limited to the following method.

Examples of the method of producing the packaging material 10 include a method including the following steps S11 through S14.

Step S11: Step of forming the anticorrosion treatment layer 16 on one surface of the metal foil layer 15.

Step S12: Step of producing a laminate by bonding the first base material layer 11 to the second base material layer 13 via the first adhesive layer 12.

Step S13: Step of bonding the other surface (on the opposite side to where the anticorrosion treatment layer 16 is formed) of the metal foil layer 15 to a surface of the second base material layer 13 in the laminate via the second adhesive layer 14.

Step S14: Step of forming the sealant layer 18 on the anticorrosion treatment layer 16 via the sealant adhesive layer 17.

(Step S11)

At step S11, the anticorrosion treatment layer 16 is formed on one surface of the metal foil layer 15 by, for example, coating an anticorrosion treatment agent on one surface of the metal foil layer 15, followed by drying. Examples of the anticorrosion treatment agent include the anticorrosion treatment agent for use in ceria sol treatment, the anticorrosion treatment agent for use in chromate treatment, and the like mentioned above. The method of coating the anticorrosion treatment agent is not particularly limited, and various methods may be used, such as gravure coating, reverse coating, roll coating, and bar coating.

(Step S12)

At step S12, using an adhesive for forming the first adhesive layer 12, the second base material layer 13 is bonded to the first base material layer 11 using a method such as dry lamination, thereby obtaining a laminate in which the first base material layer 11, the first adhesive layer 12, and the second base material layer are laminated in this order. At step S12, to promote adhesion, aging may be performed at a temperature of from 40° C. to 100° C. The aging time is from 1 to 10 days, for example.

(Step S13)

At step S13, the other surface (on the opposite side to where the anticorrosion treatment layer 16 is formed) of the metal foil layer 15 is bonded to a surface of the second base material layer 13 in the laminate, using an adhesive for forming the second adhesive layer 14 and using a technique such as dry lamination. At step S13, to promote adhesion, aging may be performed at a temperature of from 40° C. to 100° C. The aging time is from 1 to 10 days, for example.

(Step S14)

Following step S13, the sealant layer 18 is formed on the anticorrosion treatment layer 16 via the sealant adhesive layer 17, the anticorrosion treatment layer 16 being in the laminate in which the first base material layer 11, the first adhesive layer 12, the second base material layer 13, the second adhesive layer 14, the metal foil layer 15, and the anticorrosion treatment layer 16 are laminated in this order. The sealant layer 18 may be laminated by dry lamination or sandwich lamination, or may be laminated by coextrusion together with the sealant adhesive layer 17. From the perspective of improving adhesion, the sealant layer 18 is preferably laminated by, for example, sandwich lamination or coextrusion together with the sealant adhesive layer 17, and more preferably laminated by sandwich lamination.

The packaging material 10 is produced through steps S11 to S14 described above. The order of steps in the method of producing the packaging material 10 is not limited to the method of sequentially performing steps S11 to S14. The order of the steps to be performed may be changed appropriately, for example, to performing step S11 after step S12.

When the packaging material 20 is produced through the method of producing the packaging material 10 described above, step S12 can be skipped and, at step S13, the other surface (on the opposite side to where the anticorrosion treatment layer 16 is formed) of the metal foil layer 15 can be bonded to the base material layer 21 such as by dry lamination, using an adhesive for forming the adhesive layer 22. Other than this, the method of producing the packaging material 10 described above applies.

[Power Storage Device]

The following description sets forth a power storage device provided with the packaging material 10 or 20 as a container. The power storage device is provided with a battery element 1 including electrodes, leads 2 extending from the respective electrodes, and a container for storing the battery element 1. The container is formed of the power storage device packaging material 10 or 20, so that the sealant layer 18 is located inside the container. The container may be produced by layering two packaging materials so that the sealant layers 18 face each other, followed by heat sealing the perimeter portions of the layered packaging material 10 or 20, or may be produced by folding back one packaging material so that surfaces thereof are overlapped with each other, followed by similarly heat sealing the perimeter portions of the packaging material 10 or 20. Examples of the power storage device include secondary batteries, such as a lithium ion battery, a nickel metal hydride battery, and a lead acid storage battery, and electrochemical capacitors, such as an electric double layer capacitor.

The leads 2 are held and hermetically sealed by the packaging material 10 or 20 forming the container, with the sealant layer 18 being located inside the container. The leads 2 may be held by the packaging material 10 or 20 via a tab sealant.

[Method of Producing Power Storage Device]

Figure 3A:
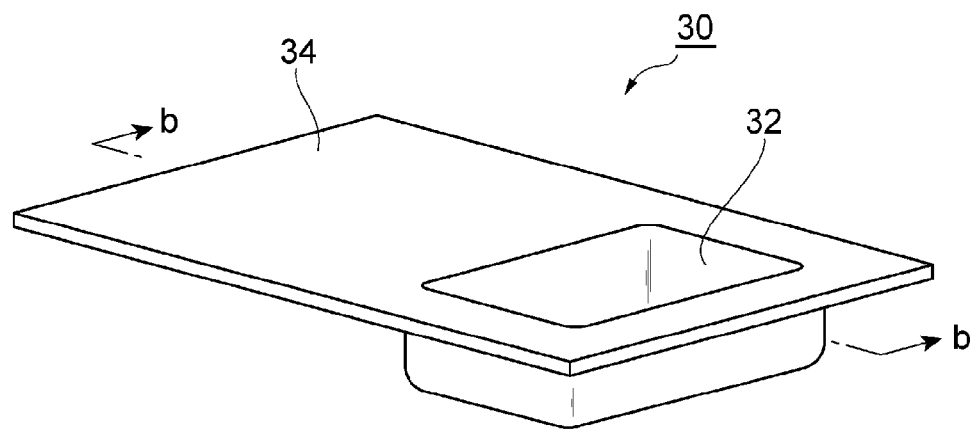
FIGS. 3A and 3B are a set of diagrams illustrating an embossed packaging material obtained using a power storage device packaging material according to an embodiment of the present invention, with FIG. 3A illustrating a perspective view thereof and with FIG. 3B illustrating a longitudinal sectional view of the embossed packaging material illustrated in FIG. 3A, taken along the line b-b.
Figure 3B:
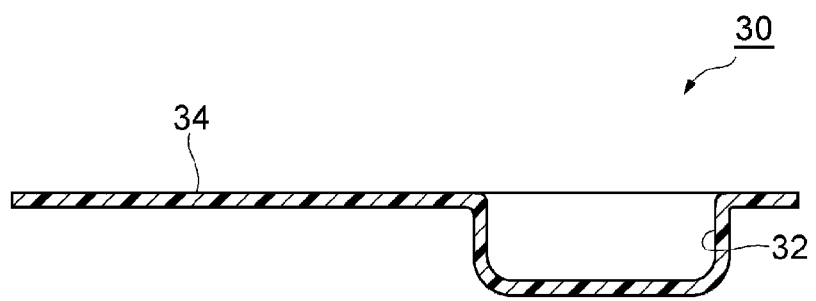

The following description sets forth a method of producing a power storage device using the packaging material 10 described above. The description herein is provided by way of an example of producing a secondary battery 40 using an embossed packaging material 30. FIGS. 3A and 3B illustrate the embossed packaging material 30. FIGS. 4A-4D are a set of perspective views illustrating a procedure of producing a single side formed battery using the packaging material 10. The secondary battery 40 may be a double side formed battery, which is produced by preparing two packaging materials, such as the embossed packaging materials 30, and bonding the packaging materials to each other after adjusting the alignment.

The secondary battery 40 that is a single side formed battery is produced by, for example, the following steps S21 to S25.

Step S21: Step of preparing the packaging material 10, the battery element 1 including the electrodes, and the leads 2 extending from the respective electrodes.

Step S22: Step of forming a recess 32 on one surface of the packaging material 10 to place the battery element 1 therein (refer to FIGS. 4A and 4B).

Figure 4A:
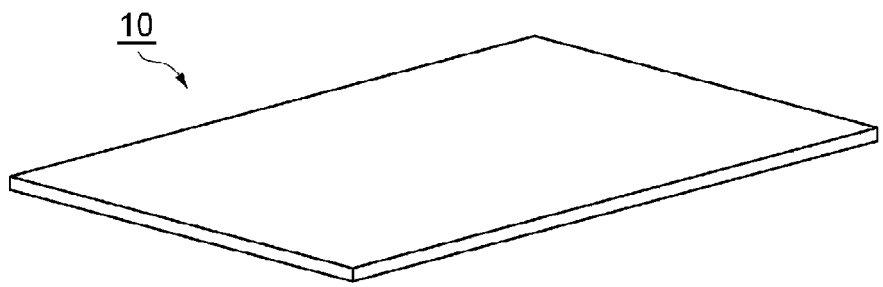
FIGS. 4A-4D is a set of perspective views illustrating steps of producing a secondary battery using a power storage device packaging material according to an embodiment of the present invention, with FIG. 4A illustrating a power storage device packaging material, with FIG. 4B illustrating the power storage device packaging material processed into an embossed structure and a battery element, with FIG. 4C illustrating the power storage device packaging material with a part thereof being folded back and the ends thereof being heat sealed, and with FIG. 4D illustrating packaging material with the folded portion on both sides being turned up.
Figure 4B:
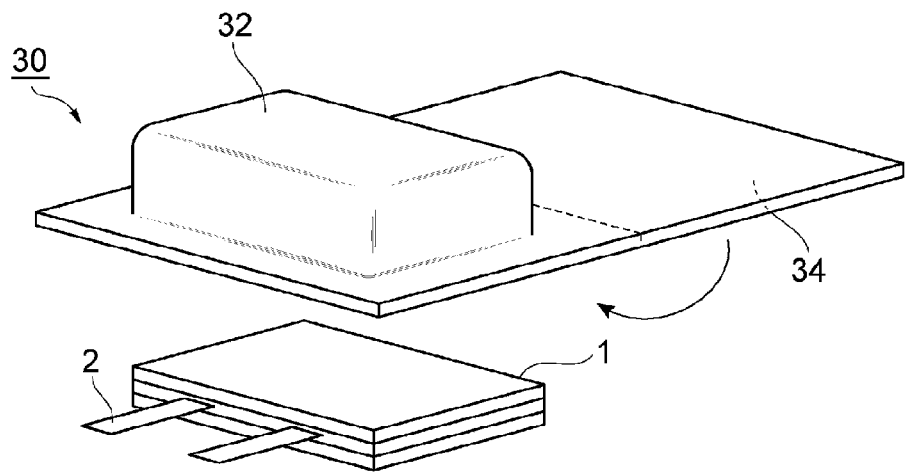
Figure 4C:
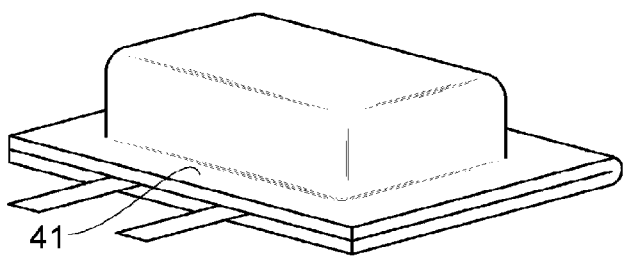

Step S23: step of placing the battery element 1 in a shaped area (recess 32) of the embossed packaging material 30, and folding back the embossed packaging material 30 to cover the recess 32 with a lid 34, followed by pressure heat sealing one side of the embossed packaging material 30 to hold the leads 2 extending from the battery element 1 (refer to FIGS. 4B and 4C).

Step S24: Step of pressure heat sealing another side, leaving the side holding the leads 2 unsealed, and injecting an electrolyte from the side left unsealed, followed by pressure heat sealing the side left unsealed in vacuum (refer to FIG. 4C).

Figure 4D:
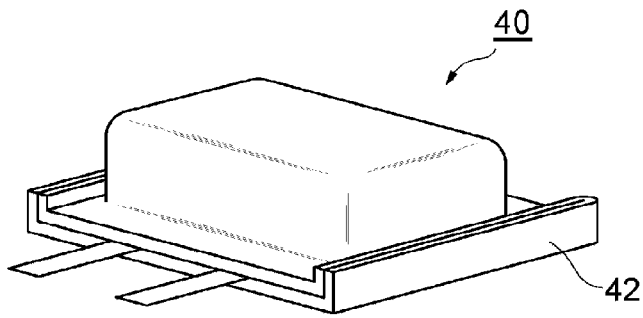

Step S25: Step of trimming pressure heat sealed side end portions other than the side holding the leads 2 and bending the side end portions towards the shaped area (recess 32) (FIG. 4D).

(Step S21)

At step S21, the packaging material 10, the battery element 1 including the electrodes, and the leads 2 extending from the respective electrodes are prepared. The packaging material 10 is prepared on the basis of the embodiment described above. The battery element 1 and the leads 2 are not particularly limited, and a known battery element 1 and known leads 2 may be used.

(Step S22)

At step S22, the recess 32 is formed to place the battery element 1 on the sealant layer 18 of the packaging material 10. The recess 32 in plan view has a shape conforming to the shape of the battery element 1, such as a rectangular shape in plan view. The recess 32 is formed by pressing a presser having a pressing surface such as in a rectangular shape, against part of the packaging material 10 in the thickness direction. The spot to be pressed, that is, the recess 32, is formed at a position deviated toward an end of the packaging material 10 in the longitudinal direction, from the center of the packaging material 10 cut out into a rectangular shape. Thus, the portion including the other end and not including the recess 32 can be folded back after forming to serve as a lid (lid 34).

Specifically, the method of forming the recess 32 includes forming using a die (deep drawing). In the forming, a male die and a female die can be used, which are arranged so that a gap of not less than the thickness of the packaging material 10 is formed therebetween, and the male die is pressed into the female die together with the packaging material 10. By adjusting the amount of pressing the male die, the depth of the recess 32 (amount of deep drawing) can be adjusted as desired. Forming the recess 32 in the packaging material 10, the embossed packaging material 30 is obtained. The embossed packaging material 30 has a shape as illustrated in FIGS. 3A and 3B, for example. FIG. 3A is a perspective view of the embossed packaging material 30 and FIG. 3B is a longitudinal cross-sectional view of the embossed packaging material 30 taken along the line b-b of FIG. 3A.

(Step S23)

At step S23, the battery element 1 including a positive electrode, a separator, a negative electrode, and the like is arranged in the shaped area (recess 32) of the embossed packaging material 30. The leads 2 extending from the battery element 1 and respectively joined to the positive electrode and the negative electrode are drawn out of the shaped area (recess 32). Then, the embossed packaging material 30 is folded back along a substantially center line perpendicular to the longitudinal direction, and surfaces of the sealant layer 18 are overlapped with each other, followed by pressure heat sealing one side of the embossed packaging material 30 holding the leads 2. The pressure heat sealing is controlled under three conditions of temperature, pressure, and time, which are set appropriately. The temperature for pressure heat sealing is preferably not less than the temperature for melting the sealant layer 18.

The thickness of the sealant layer 18 before heat sealing is preferably in the range of not less than 40% to not more than 80% relative to the thickness of each lead 2. When the sealant layer 18 has a thickness of not less than the lower limit, the heat sealing resin is likely to sufficiently fill the end portions of the leads 2. When the sealant layer 18 has a thickness of not more than the upper limit, thickness in the end portions of the packaging material 10 of the secondary battery 40 can be suppressed, and the amount of moisture entering from the end portions of the packaging material 10 can be reduced.

(Step S24)

At step S24, leaving one side holding the leads 2 unsealed, other sides are pressure heat sealed. Then, electrolyte is injected from the side left unsealed, followed by pressure heat sealing in vacuum the side left unsealed. The conditions for pressure heat sealing are same as those stated at step S23.

(Step S25)

The side end portions of the pressure heat sealed perimeters other than the side holding the leads 2 are trimmed to remove the sealant layer 18 protruding from the end portions. Then, the pressure heat sealed perimeters are turned up towards the shaped area 32 to form turn-up portions 42, thereby producing the secondary battery 40.

When a power storage device is produced using the packaging material 20, the packaging material 20 may be used instead of the packaging material 10 in the method of producing a power storage device using the packaging material 10 described above.

EXAMPLES

The present invention will be more specifically described below by way of examples, but the present invention is not limited to the following examples.

[Materials Used]

The materials used in Examples and Comparative Examples are as follows.

(First Base Material Layer 11 or Base Material Layer 21)

The base materials shown in Table 1 below were used.

TABLE 1

| First Base Material Layer 11 or Base Material Layer 21 | Material | Contained Component | Content of Component (mass %) | Thickness (μm) |
|---|---|---|---|---|
| A-1 | Biaxially Oriented PET Film | Polyester Elastomer | 10 | 16 |
| A-2 | Biaxially Oriented PET Film | Amorphous Polyester | 40 | 16 |
| A-3 | Biaxially Oriented PET Film | Polyester Elastomer | 2 | 16 |
| A-4 | Biaxially Oriented PET Film | Polyester Elastomer | 15 | 16 |
| A-5 | Biaxially Oriented PET Film | Amorphous Polyester | 20 | 16 |
| A-6 | Biaxially Oriented PET Film | Amorphous Polyester | 60 | 16 |
| A-7 | Biaxially Oriented PET Film | Polyester Elastomer | 10 | 5 |
| A-8 | Biaxially Oriented PET Film | Polyester Elastomer | 10 | 30 |
| A-9 | Biaxially Oriented PET Film | Amorphous Polyester | 40 | 5 |
| A-10 | Biaxially Oriented PET Film | Amorphous Polyester | 40 | 30 |
| A-11 | Biaxially Oriented PET Film | Polyester Elastomer | 10 | 12 |
| A-12 | Biaxially Oriented PET Film | Amorphous Polyester | 40 | 12 |
| A-13 | Biaxially Oriented PET Film | Polyester Elastomer | 2 | 12 |
| A-14 | Biaxially Oriented PET Film | Polyester Elastomer | 15 | 12 |
| A-15 | Biaxially Oriented PET Film | Amorphous Polyester | 20 | 12 |
| A-16 | Biaxially Oriented PET Film | Amorphous Polyester | 60 | 12 |
| A-17 | Biaxially Oriented PET Film | Polyester Elastomer | 10 | 4 |
| A-18 | Biaxially Oriented PET Film | Polyester Elastomer | 10 | 20 |
| A-19 | Biaxially Oriented PET Film | Amorphous Polyester | 40 | 4 |
| A-20 | Biaxially Oriented PET Film | Amorphous Polyester | 40 | 20 |
| A-21 | Biaxially Oriented PET Film | — | — | 16 |
| A-22 | Biaxially Oriented PET Film | Polyester Elastomer | 1 | 16 |
| A-23 | Biaxially Oriented PET Film | Polyester Elastomer | 16 | 16 |
| A-24 | Biaxially Oriented PET Film | Amorphous Polyester | 15 | 16 |
| A-25 | Biaxially Oriented PET Film | Amorphous Polyester | 65 | 16 |
| A-26 | Biaxially Oriented PET Film | Polyester Elastomer | 10 | 35 |
| A-27 | Biaxially Oriented PET Film | Amorphous Polyester | 40 | 35 |
| A-28 | Biaxially Oriented PET Film | Polyester Elastomer | 1 | 12 |
| A-29 | Biaxially Oriented PET Film | Polyester Elastomer | 16 | 12 |
| A-30 | Biaxially Oriented PET Film | Amorphous Polyester | 15 | 12 |
| A-31 | Biaxially Oriented PET Film | Amorphous Polyester | 65 | 12 |
| A-32 | Biaxially Oriented PET Film | Polyester Elastomer | 10 | 3 |
| A-33 | Biaxially Oriented PET Film | Amorphous Polyester | 40 | 3 |
| A-34 | Biaxially Oriented PET Film | — | — | 12 |

"Hytrel" (trade name, manufactured by Du Pont-TORAY Co., Ltd.) was used as the polyester elastomer shown in Table 1, and "SKYGREEN" (trade name, manufactured by SK Chemicals) as the amorphous polyester shown in Table 1. As the base material A-21 and the base material A-34, a biaxially oriented PET film not containing polyester elastomer and amorphous polyester (trade name "LUMIRROR", manufactured by TORAY ADVANCED FILM Co., Ltd.) was used.

(First Adhesive Layer 12 or Adhesive Layer 22)

Adhesive B-1: Polyester urethane adhesive (trade name "TAKELAC/TAKENATE", manufactured by Mitsui Chemicals, Inc.)

(Second Base Material Layer 13)

The bases materials shown in Table 2 below were used.

TABLE 2

| Second Base Material Layer 13 | Material | Thickness (μm) |
|---|---|---|
| C-1 | Biaxially Oriented Nylon 6 Film | 15 |
| C-2 | Biaxially Oriented Nylon 6 Film | 5 |
| C-3 | Biaxially Oriented Nylon 6 Film | 20 |
| C-4 | Biaxially Oriented PET Film | 16 |
| C-5 | Biaxially Oriented Nylon 6 Film | 4 |
| C-6 | Biaxially Oriented Nylon 6 Film | 25 |
| C-7 | Unoriented Nylon Film | 20 |

A biaxially oriented PET film (trade name "LUMIRROR", manufactured by TORAY ADVANCED FILM Co., Ltd.) was used as the base material C-4 shown in Table 2, and an unoriented nylon film (trade name "DIAMIRON C", manufactured by Mitsubishi Plastics, Inc.) was used as the base material C-7 shown in Table 2.

(Second Adhesive Layer 14)

Adhesive D-1: Polyester urethane adhesive (trade name "TAKELAC/TAKENATE" manufactured by Mitsui Chemicals, Inc.)

(Metal Foil Layer 15)

Metal foil E-1: Soft aluminum foil 8079 material (manufactured by Toyo Aluminium K.K., thickness of 40 μm)

(Anticorrosion Treatment Layer 16)

Treatment agent F-1: Coating type treatment agent for use in ceria sol treatment mainly containing cerium oxide, phosphoric acid, and an acrylic resin.

(Sealant Adhesive Layer 17)

Adhesive resin G-1: Polypropylene resin graft-modified with maleic anhydride (trade name "Admer", manufactured by Mitsui Chemicals, Inc.)

(Sealant Layer 18)

Film H-1: Unoriented polypropylene film (thickness of 60 μm) whose surface serving as an inner surface has been corona-treated (trade name "GHC", manufactured by Mitsui Chemicals Tohcello, Inc.)

Examples 1 to 41 and Comparative Examples 1 to 5

(Preparation of Packaging Material)

The treatment agent F-1 was coated on one surface of the metal foil E-1 serving as the metal foil layer 15, followed by drying to form the anticorrosion treatment layer 16. Then, any one of the base materials A-1 to A-10, A-17, A-19, and A-21 to A-27 serving as the base material layer 21 was bonded to a surface of the metal foil layer 15 by dry lamination using the adhesive B-1, the surface of the metal foil layer 15 being on the opposite side to the anticorrosion treatment layer 16. Any one of the base materials C-1 to C-7 serving as the second base material layer 13 was bonded to any one of the base materials A-11 to A-20 and A-28 to A-34 serving as the first base material layer 11 by dry lamination using the adhesive B-1. Then, the second base material layer 13 side of the laminate formed of the first base material layer 11, the first adhesive layer 12, and the second base material layer 13 was bonded to a surface of the metal foil layer 15 by dry lamination using the adhesive D-1, the surface of the metal foil layer 15 being on the opposite side to the anticorrosion treatment layer 16. Then, the resultant laminate was aged at 60° C. for 6 days. Then, the adhesive resin G-1 was extruded by an extruder onto the anticorrosion treatment layer 16 side of the laminate thus obtained to form the sealant adhesive layer 17. The film H-1 was then bonded to the sealant adhesive layer 17 for sandwich lamination to form the sealant layer 18. Then, the laminate thus obtained was subjected to thermocompression at 190° C. to prepare packaging materials of Examples 1 to 41 and Comparative Examples 1 to 5. The thickness of the adhesive layer 22 after lamination was 5 μm, the thickness of the first adhesive layer 12 after lamination was 5 μm, the thickness of the second adhesive layer 14 after lamination was 5 μm, and the thickness of the sealant adhesive layer 17 after lamination was 25 μm. Table 3 shows base materials used in the examples.

(Evaluation of Amount of Warpage after Forming)

The packaging materials obtained in Examples and Comparative Examples were cut into a 120 mm×260 mm rectangular shape and placed in a forming device so that the sealant layer was at the top. Forming depth was set to 3 mm in the forming device, and cold forming was performed in an environment of 23° C. room temperature of and −35° C. dew point temperature. A punch die used had a 70 mm×80 mm rectangular cross section, a bottom surface with a 0.75 mm punch radius (RP), and a side surface with a 1.5 mm punch corner radius (RCP). Another die used had an opening upper surface with a 0.75 mm die radius (RD). A clearance between the punch die and the second die was 0.2 mm. A shaped area was provided at substantially the center of a half of the surface of the cut packaging material assuming it was divided along substantially the center line perpendicular to the longitudinal direction. That is, the shaped area was provided so that both ends of the shaped area were located at 25 mm from respective ends of the cut packaging material along the short sides.

After forming, the packaging material was allowed to stand still on a horizontal table in a state where the first base material layer 11 was at the top for 60 minutes in an environment of 23° C. room temperature and −35° C. dew point temperature. A maximum value of the distance from the table to a side of the non-formed area along the short side was measured and the measured value was taken to be the amount of warpage. However, since the warpage at an angle of not less than 90 degrees disabled measurement, such a case was categorized as measurement not being possible. The amount of warpage was evaluated according to the following evaluation criteria. The results are shown in Table 3.

A: Amount of warpage was less than 50 mm.

B: Amount of warpage was not less than 50 mm and less than 75 mm.

C: Amount of warpage was not less than 75 mm and less than 100 mm.

D: Amount of warpage was 100 mm or more.

(Evaluation of Forming Depth)

The packaging materials obtained in Examples and Comparative Examples were each cut into a 150 mm×190 mm rectangular shape and placed in a forming device, with the sealant layer being at the top. The forming depth was set to a rate of 1 to 10 mm per 1 mm in the forming device, and cold forming was performed in an environment of 23° C. room temperature and −35° C. dew point temperature. The formability in relation to the forming depth was individually evaluated according to the following criteria. A punch die used had a 100 mm×150 mm rectangular cross section, a bottom surface with a 0.75 mm punch radius (RP), and a side surface with a 1.5 mm punch corner radius (RCP). Another die used had an opening upper surface with a 0.75 mm die radius (RD). The forming depth was evaluated according to the following evaluation criteria. The results are shown in Table 3.

A: Deep drawing with a forming depth of 6 mm or more was possible without causing breaking or cracks.

B: Deep drawing with a forming depth of not less than 5 mm and less than 6 mm was possible without causing breaking or cracks.

C: Deep drawing with a forming depth of not less than 4 mm and less than 5 mm was possible without causing breaking or cracks.

D: Breaking or cracks were caused by deep drawing with a forming depth of less than 4 mm.

(Evaluation of Heat Resistance)

The packaging materials obtained in Examples and Comparative Examples were each cut into two 50 mm×200 mm strips. Then, the cut samples were sandwiched between heat sealing bars heated at 200° C. or 210° C. in a state where the base material layers were in face-to-face relation to evaluate whether the base material layers were adhered to each other. Heat resistance was evaluated according to the following evaluation criteria. The results are shown in Table 3.

A: No adhesion was observed at a heat sealing temperature of 210° C.

B: No adhesion was observed at a heat sealing temperature of 200° C. but was observed at 210° C.

C: Adhesion was observed at a heat sealing temperature of 200° C.

TABLE 3

| Examples | First Base material layer 11 or Base material layer 21 | Second Base material layer 13 | Evaluation of Warpage After Forming | Evaluation of Forming Depth | Evaluation of Heat Resistance |
| --- | --- | --- | --- | --- | --- |
| Example 1 | A-1 | — | A | A | A |
| Example 2 | A-2 | — | A | A | A |
| Example 3 | A-3 | — | B | B | A |
| Example 4 | A-4 | — | A | B | B |
| Example 5 | A-5 | — | B | B | A |
| Example 6 | A-6 | — | A | B | B |
| Example 7 | A-7 | — | A | B | A |
| Example 8 | A-8 | — | B | A | A |
| Example 9 | A-9 | — | A | B | A |
| Example 10 | A-10 | — | B | A | A |
| Example 11 | A-11 | C-1 | A | A | A |
| Example 12 | A-12 | C-1 | A | A | A |
| Example 13 | A-13 | C-1 | B | A | A |
| Example 14 | A-14 | C-1 | A | A | B |
| Example 15 | A-15 | C-1 | B | A | A |
| Example 16 | A-16 | C-1 | A | A | B |
| Example 17 | A-17 | C-1 | B | A | A |
| Example 18 | A-18 | C-1 | A | A | A |
| Example 19 | A-19 | C-1 | B | A | A |
| Example 20 | A-20 | C-1 | A | A | A |
| Example 21 | A-11 | C-2 | A | B | A |
| Example 22 | A-11 | C-3 | B | A | A |
| Example 23 | A-12 | C-2 | A | B | A |
| Example 24 | A-12 | C-3 | B | A | A |
| Example 25 | A-22 | — | C | C | A |
| Example 26 | A-23 | — | A | C | C |
| Example 27 | A-24 | — | C | C | A |
| Example 28 | A-25 | — | A | C | C |
| Example 29 | A-17 | — | A | C | A |
| Example 30 | A-26 | — | C | A | A |
| Example 31 | A-19 | — | A | C | A |
| Example 32 | A-27 | — | C | A | A |
| Example 33 | A-28 | C-1 | C | A | A |
| Example 34 | A-29 | C-1 | A | A | C |
| Example 35 | A-30 | C-1 | C | A | A |
| Example 36 | A-31 | C-1 | A | A | C |
| Example 37 | A-32 | C-1 | C | A | A |
| Example 38 | A-33 | C-1 | C | A | A |
| Example 39 | A-12 | C-5 | A | C | A |
| Example 40 | A-11 | C-6 | C | A | A |
| Example 41 | A-12 | C-6 | C | A | A |
| Comparative Example 1 | A-21 | — | D | D | A |
| Comparative Example 2 | A-11 | C-4 | A | D | A |
| Comparative Example 3 | A-34 | C-1 | D | A | A |
| Comparative Example 4 | A-12 | C-4 | A | D | A |
| Comparative Example 5 | A-11 | C-7 | A | D | A |

As described above, Examples with the structure of the present invention could provide the power storage device packaging materials capable of maintaining sufficient formability and reducing the amount of warpage after forming.

REFERENCE SIGNS LIST

1: battery element,
2: lead,
10: packaging material (power storage device packaging material),
11: first base material layer,
12: first adhesive layer,
13: second base material layer,
14: second adhesive layer,
15: metal foil layer,
16: anticorrosion treatment layer,
17: sealant adhesive layer,
18: sealant layer,
21: base material layer,
22: adhesive layer,
30: embossed packaging material,
32: shaped area (recess),
34: lid,
40: secondary battery.

What is claimed is:

1. A power storage device packaging material, comprising:
a base material layer;
a metal foil layer formed on one surface of the base material layer via an adhesive layer; and a sealant layer arranged on a surface of the metal foil layer, the surface of the metal foil layer having the sealant layer being on the opposite side of the metal foil layer to the base material layer, wherein the base material layer contains a polyester resin that contains at least an amorphous polyester and further contains a polyester elastomer, a content of the polyester elastomer in the polyester resin is in a range of 2 to 15 mass % relative to a total amount of the polyester resin, and a content of the amorphous polyester is in a range of 20 to 60 mass % relative to a total amount of the polyester resin.

2. The power storage device packaging material of claim 1, wherein the base material layer has a thickness in a range of not less than 5 μm to not more than 30 μm.

3. A power storage device packaging material, comprising:

a first base material layer;

a second base material layer formed on one surface of the first base material layer via a first adhesive layer;

a metal foil layer formed on a surface of the second base material layer via a second adhesive layer, the surface of the second base material layer having the metal foil layer being on the opposite side of the second base material layer to the first base material layer; and a sealant layer arranged on a surface of the metal foil layer, the surface of the metal foil layer having the sealant layer being on the opposite side of the metal foil layer to the second base material layer, wherein the first base material layer contains a polyester resin that contains at least an amorphous polyester and further contains a polyester elastomer, a content of the polyester elastomer in the polyester resin is in a range of 2 to 15 mass % relative to a total amount of the polyester resin, and a content of the amorphous polyester is in a range of 20 to 60 mass % relative to a total amount of the polyester resin, and the second base material layer is an oriented polyamide film.

4. The power storage device packaging material of claim 3, wherein the first base material layer has a thickness in a range of not less than 4 μm to not more than 20 μm, and the second base material layer has a thickness in a range of not less than 5 μm to not more than 20 μm.

5. A power storage device, comprising:

a battery element including electrodes;

leads respectively extending from the electrodes; and a container for storing the battery element therein, wherein the container is formed of the power storage device packaging material according to claim 1, with the sealant layer being located inside.

* * * * *